Figure 1:
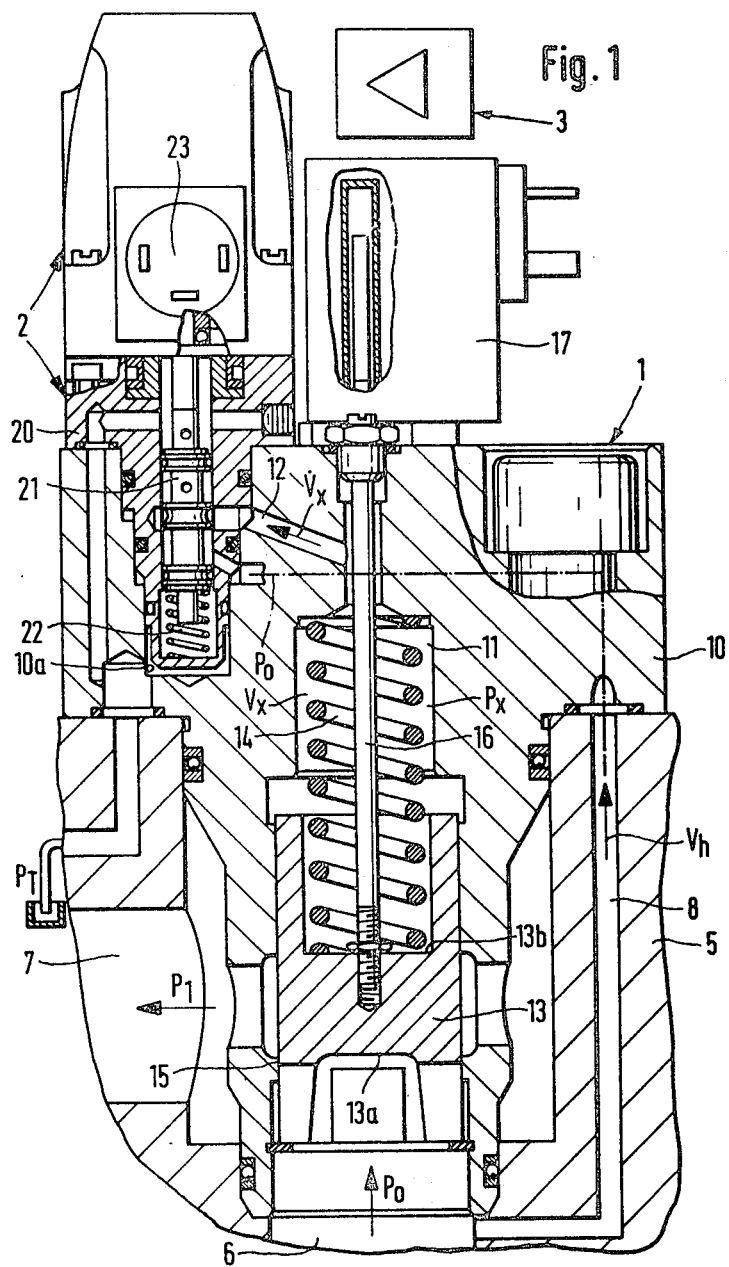

United States Patent [19]

Bender

[11] Patent Number: 4,478,245
[45] Date of Patent: Oct. 23, 1984

[54] ELECTRICALLY CONTROLLABLE VALVE ASSEMBLY

[75] Inventor: Bernd Bender, Lich, Fed. Rep. of Germany

[73] Assignee: Vickers, Incorporated, Troy, Mich.

[21] Appl. No.: 411,513

[22] Filed: Aug. 25, 1982

[30] Foreign Application Priority Data

Sep. 2, 1981 [EP] European Pat. Off. ........ 81106845.1

[51] Int. Cl.$^3$ .................... F16K 37/00; F16K 31/40
[52] U.S. Cl. ................................ 137/554; 137/487.5; 251/30
[58] Field of Search ................ 137/553, 554, 487.5; 251/25, 30

[56] References Cited

U.S. PATENT DOCUMENTS

| 3,024,801 | 3/1962 | Carls | 251/30 |
| 4,219,181 | 8/1980 | Joelson | 251/30 |
| 4,340,086 | 7/1982 | Hemm et al. | 251/30 X |

FOREIGN PATENT DOCUMENTS 2065929  7/1981  United Kingdom ................ 251/30

Primary Examiner—Martin P. Schwadron
Assistant Examiner—John A. Rivell
Attorney, Agent, or Firm—Barnes, Kisselle, Raisch, Choate, Whittemore & Hulbert

[57] ABSTRACT

An electrically controllable valve assembly for hydraulic adjustment of a piston includes a pilot valve controllable by an electronic controller. The pilot valve has a spool and a restrictor array comprising first and second variable restrictor means and a fixed restrictor means, through which flows an auxiliary bleedflow of hydraulic fluid. The variable restrictor means are adjusted in opposite directions in order to produce from the bleed flow a control pressure which is responsible for positioning of the piston of the valve assembly. A pressure drop is taken off at the fixed restrictor means, and acts on the spool to produce a negative feedback action, thereby always to produce a given displacement control flow, irrespective of the system pressure, while avoiding control oscillations.

10 Claims, 4 Drawing Figures

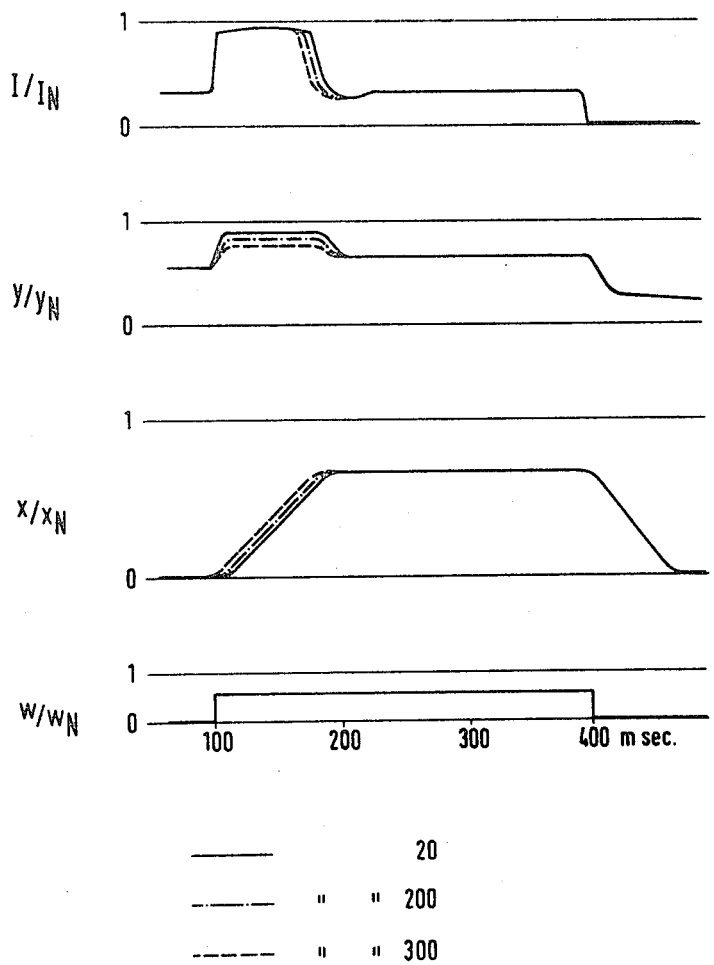

ELECTRICALLY CONTROLLABLE VALVE ASSEMBLY

The invention relates generally to an electrically controllable valve assembly

A known electrically controllable valve assembly, of the general kind of which the present invention relates, includes a displaceable piston constituting the member to be adjusted, a pilot valve for controlling the position of the displaceable piston, and an electronic controller for controlling the pilot valve. One side of the displaceable piston is subjected to a force, while a second force produced at least partly hydraulically by pressure in a control chamber is applied to the other side of the piston. The pilot valve has a restrictor array for bleed flow of hydraulic fluid from a main delivery line to a tank line. The operative member of the pilot valve is a spool for adjusting the restrictor array, and an electrically actuable operating member is provided for adjusting the position of the spool In a known throttle valve assembly of this kind (Rexroth Catalogue No. RD00321/10.80 valve ENV 043-05), the restrictor array which is formed by means of the pilot valve spool comprises first and second variable restrictor means, with the control line opening therebetween. The control flow is a function of the size of the restrictor means and the hydraulic control pressure; at high control pressures, the control flow increases and the movements of the displaceable piston which are produced as a result, are quicker than when lower control pressures are involved. However, the control and opening times of the displaceable piston should not suffer from considerable variation, from the point of view of the electronic controller. In addition, upon rapid movements of the displaceable piston, control oscillations also occur, in the transition from the dynamic to the static control mode of operation.

For the purposes of damping the movement of the spool of the pilot valve, the abovementioned electrically controllable restrictor valve also includes an extension portion on the spool, which moves into a discharge opening in the event of spool movements of substantial magnitude, and thereby temporarily forms a throttle means for retarding the bleed flow in its discharge, so that the resulting low pressure acts on the pilot valve spool, to oppose movement thereof.

However, a disadvantage with that arrangement is the relatively high manufacturing cost because of the degree of precision and accuracy required in regard to the components thereof, and also the fact that the above-mentioned control oscillations are only reduced in magnitude, but cannot be prevented.

An object of the present intention is therefore to provide an electrically controllable valve assembly such that the hydraulic control flows are substantially independent of the range of pressure in respect of which the valve assembly is employed.

The invention also seeks to provide an electrically controllable valve assembly such that an asymptotic control performance can be achieved, in the transition from the dynamic control mode into the static control mode, without positional overshoot.

The present invention accordingly provides an electrically controllable valve assembly including a displaceable piston constituting the member to be adjusted, with a first force acting on one side of the piston and a second force acting on the other side of the piston, the second force being produced at least partly hydraulically by pressure in a control chamber; a pilot valve for controlling the position of the piston, including a restrictor array for bleed flow from a main delivery line to a tank line, a spool for adjustment of the restrictor array and an electrically actuable control member for adjusting the position of the spool; and an electronic control for controlling the pilot valve. The restrictor array comprises a first variable restrictor disposed between a branch or by-pass duct from the main delivery line and a control line connecting the above-mentioned control chamber of the main valve, and the pilot valve, and a second variable restrictor disposed between the control line and a low-pressure chamber, the low pressure acting on the spool in the direction of return movement thereof. The restrictor array further includes a third, permanently effective fixed restrictor means between the low-pressure chamber and the above-mentioned tank line.

In accordance with the invention therefore, the third restrictor means is permanently or constantly operative so that the first low-pressure chamber is subjected to a certain hydraulic pressure, the magnitude of which also depends on whether a hydraulic control flow flows between the pilot valve and the main valve, which is the case when the main valve is set to a fresh position. The hydraulic control flow results for example in an additional pressure drop at the third restrictor means, whereby the spool of the pilot valve is displaced in a direction such as to increase the flow cross-section of the first restrictor means and reduce the flow cross-section of the second restructor means. Consequently, the flow of hydraulic fluid flowing from the main valve to the pilot valve is influenced in a negative feedback mode. Although, with a higher level of pressure and thus a greater pressure drop to the tank line, the flow of hydraulic fluid flowing away through the second restrictor means could be increased, the negative feedback effect referred to above has the result that the second restrictor means is made relatively narrower so that the flow of hydraulic fluid flowing away through the second restrictor means remains substantially constant. That is equivalent to a given speed of displacement of the piston, and thus the control time, in the dynamic control mode. The negative feedback action also has a further effect, namely, the tendency to return the spool when the spool is displaced by solenoid means, to trigger a dynamic control operation. The tendency for return movement of the spool of the pilot valve can be so adjusted that the spool approaches its new position of adjustment, in a manner which may be referred to as asymptotic. This therefore eliminates control oscillations (that is to say, a situation in which the adjusted component goes beyond the desired fresh control position, then returns to a position which is before the desired control position, then overshoots again and so on, in a series of oscillation movements).

Further features and advantages of the construction in accordance with the present invention are set forth in the following description and in the accompanying claims.

Figure 2:
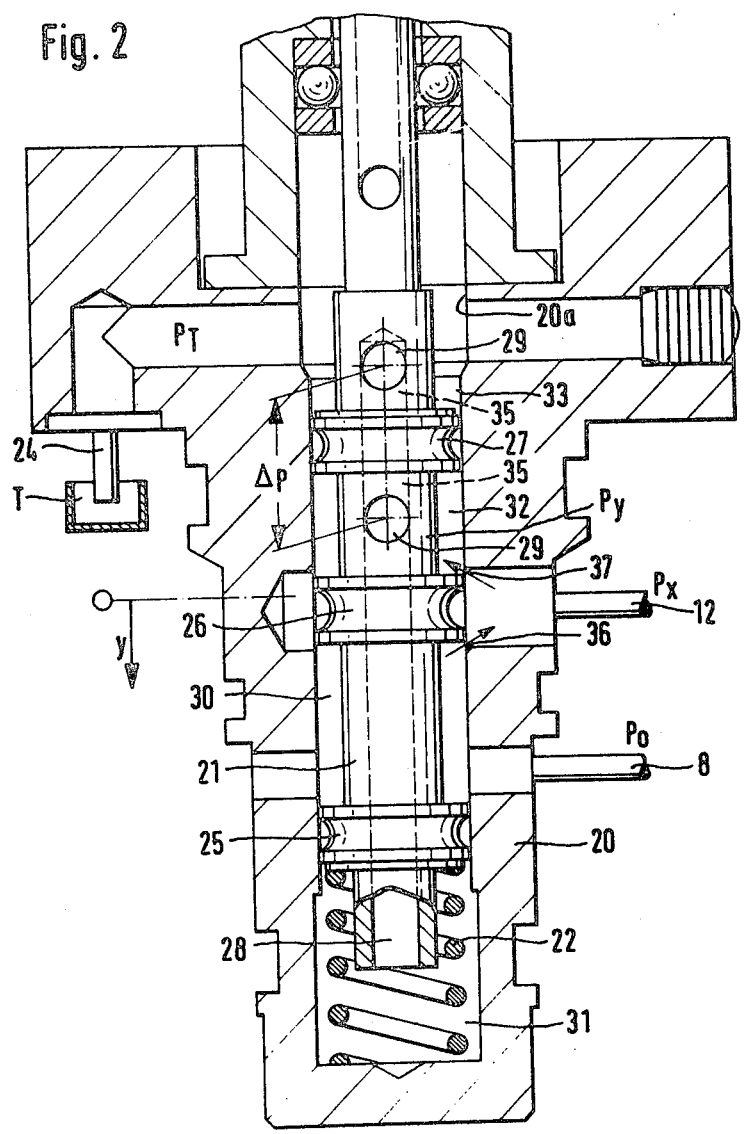
Figure 3:
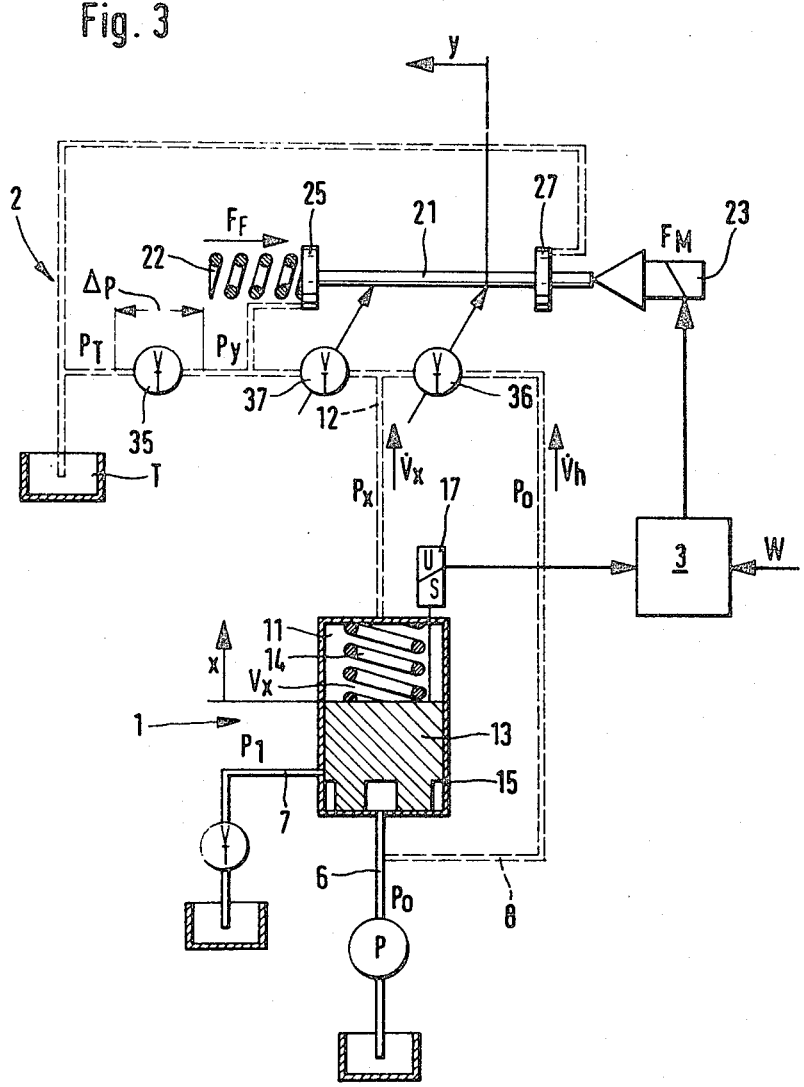

An embodiment of the invention will now be described by way of example with reference to the accompanying drawings in which:

FIG. 1 shows a partly sectional view of an electrically controllable throttle valve assembly, FIG. 2 shows a detail from FIG. 1 on an enlarged scale, FIG. 3 shows a hydraulic circuit diagram, and FIG. 4 shows a diagram in respect of various parameters versus time.

The electrically controllable throttle valve assembly comprises, as its main components, a main valve 1, a pilot valve 2 and an electronic controller 3 for controlling the pilot valve 2.

The main valve 1 is in the form of a cartridge for fitting into a housing 5 which includes a main delivery line with a feed duct 6, a discharge duct 7 and a branch duct 8. The main valve has a cartridge housing 10 with a control chamber 11 and a control conduit 12, a throttle piston 13 and a closing spring 14. The duct 6 forms a delivery pressure chamber which communicates with the duct 7 by way of a throttle cross-section 15 of varying size. On the piston 13, a distinction can be made between a delivery pressure end or side as indicated at 13a, and a control pressure end or side as indicated at 13b. The control pressure side or face 13b is subjected to the force of the closing spring 14, in addition to the control pressure.

The piston 13 is also connected by means of a rod 16 to a travel pick-up or detector 17 which can be designed as part of the electronic controller 3.

The pilot valve 2 has a cartridge housing 20 which is sealingly fitted into a stepped bore 10a in the housing 10. Disposed within the pilot valve housing 20 is a spool 21 and a return spring 22. Fitted on to the housing 20 is an electrically operated actuating magnet or solenoid device 23 which is connected to the spool 21 and which serves to change the position thereof. The device 23 and the return spring 22 in combination form an electrically actuable control member for setting the position of the spool 21.

Reference will now also be made to FIG. 2 which shows the housing 20 and the spool 21 of the valve 2 in greater detail. The housing 20 has therein a longitudinal bore 20a which forms a space within the housing, and three transverse bores, namely, viewing from the top in a downward direction in FIG. 2, a first transverse bore which communicates with a tank line 24, a second transverse bore which communicates with the control line 12, and the third transverse bore which communicates with the branch duct 8. The spool 21 has three lands or pistons 25, 26 and 27 thereon, and also a longitudinal bore 28 extending within the spool, and two transverse bores 29, whereby the space 20a within the housing 20 is divided into a delivery pressure chamber 30, a first low pressure chamber 31, a second low pressure chamber 32 and a tank chamber 33. The low-pressure chambers 31 and 32 hydraulically communicate with each other by way of the intercommunicating bores 28 and 29 in the spool 21.

It will be seen therefore that the front end of the bore 28, that is to say, the upper portion as shown in FIG. 2, and the two transverse bores 29, bridge across or bypass the piston 27 on the spool, and form a fixed laminar restrictor means 35. It will be appreciated that it is also possible for the bore 28 to be made relatively wide and to fit an orifice means therein, to act as a Bernoulli restrictor.

The second transverse bore leading to the control duct 12 is a little wider than the piston 26, as can be clearly seen from FIG. 2, so that the auxiliary flow Vh (FIG. 1), supplied from the duct 8, flows from the chamber 30 into the adjoining chamber 32, around the land 26, and from there through the constant restrictor 35 into the tank pressure chamber 33. The edges of the port 12 and the land 26 form variable restrictor means as indicated at 36 and 37, an increase in the throttle cross-section of the restrictor means 36 corresponding to a reduction in the throttle cross-section of the restrictor means 37, and vice-versa. It will be appreciated that the variable restrictor means 36 and 37 may also be embodied in other per se known ways.

Reference will now be made to FIG. 3 and the circuit diagram shown therein, to describe the mode of operation of the throttle valve assembly. The circuit shown in FIG. 3 includes a pump as indicated at P, which is operative to supply hydraulic fluid under a pressure Po to the main valve 1 which throttles the main delivery flow in such a way that the pressure set in the delivery conduit 7 is a pressure P1. The bleed flow Vh of hydraulic fluid flows continuously through the duct 8 and by way of the restrictor train formed by the restrictor means 36,37 and 35, to the tank T. The pressure Po is reduced to a value Px downstream of the restrictor means 36, to a value Py downstream of the restrictor means 37, and to the value PT downstream of the restrictor means 35. The pressure Py is applied to the piston area 25 in the direction of the force exerted by the spring 22, while the pressure PT (which is usually 0) is applied to the piston area 27 in the opposite direction to the spring force. The spool 21 is held substantially in a condition of equilibrium by the force of the controlled solenoid 23 (static control mode). The electronic controller 3 can be programmed for example in such a way as to hold the pressure P1 at a first constant value. When the pressure deviates from that desired value, the current supplied to the solenoid 23 is suitably altered so that the spool 21 is moved slightly, whereby the throttle cross-sections formed by the variable restrictor means 36 and 37 are in turn altered. This causes a change in the pressure Px and the throttle piston 13 is correspondingly displaced until the difference between the pressure P1 and its desired value is eliminated.

The electronic controller 3 may also be programmed in such a way that the throttle cross-section 15 defined by the piston 13 is held contantly in the predetermined condition x (see FIG. 3), irrespective of interference phenomena.

The dynamic control performance of the circuit shown in FIG. 3 will now be described with reference to the views shown in FIG. 4, the index N designating the respective nominal value. Let it be assumed that a positive control jump or abrupt increase in signal is imparted to the desired value signal W as shown at 100 ms in the bottom line $W/W_N$ shown in FIG. 4. The controller 3 then departs from its normal static control mode and produces a pulse I with a duration of for example 120 ms, at the level of the rated or nominal current $I_N$, which is applied to the solenoid 23, in the manner shown in the top line in in FIG. 4. This causes a change in the position y of the spool 21, as shown in line 3, in FIG. 4. That produces a reduction in the restrictor cross-section 36 and an increase in the restrictor cross-section at 37. As the bleed flow Vh is thereby cut off, the pressure Px falls and as a result of the pressure Po, the throttle piston 13 moves in the specified positive x-direction (line 2 in FIG. 4). That produces a displacement flow Vx which flows away through the increased restrictor means at 37 and the fixed restrictor means 35 and results in a pressure drop $\Delta P$ thereat. That pressure drop acts on the piston area 25 of the spool 21 and thus moves the spool 21 towards the initial position. This therefore causes the restrictor cross-section at 36 to be enlarged again, with a corresponding reduction in the restrictor cross-section at 37. The pressure drop ΔP produced therefore has the effect of a negative feedback action and results in a kind of flow control, as described hereinafter.

In FIG. 4, the measured values at a pressure of 20 bars are shown in solid lines, the measured values at 200 bars are shown in dash-dotted lines, and the measured values at 300 bars are shown in broken lines. As can be clearly seen, at higher system pressures, the electrical current pulse to the solenoid 23 does not result in substantial shifting movement y of the spool 21, with a comparatively small change in the restrictor cross-sections at 36 and 37. Therefore, at low system pressures, the variable restrictor means 37 is opened relatively wider, that when high system pressures are involved. At low system pressures, the drive actuating force of the piston 13 in the x-direction is relatively low and the restrictor cross-section at 37 is relatively large, while at high system pressures the displacement force is high and the restrictor cross-section at 37 is small so that, in both cases now being considered, the displaced control flow $\dot{V}x$ remains substantially equal, as shown by the close conformity in respect of the pitch of the $x/x_N$ line.

It should also be noted that movement of the throttle piston 13 takes place virtually without any control oscillation movements. The new desired position in respect of the throttle piston 13 is attained, in manner of speaking, in an asymptotic mode. The period of time for which the control flow $\dot{V}x$ is about 200 ms, the deviations being insignificant, in regard to high and low system pressures. Constant control times of that kind are desirable from the point of view of the electronic control circuit 3 as after such a time, the hydraulic control or measurement values which are to be applied to the controller can be reckoned as reliable and trustworthy.

The length of the switching time of the piston 13 can be determined by suitable selection in respect of the fixed restrictor means 35 and the force of the return spring 22, as well as the magnetic force of the solenoid 23; of those parameters, the width of the restrictor means 35 in particular can be easily adjusted, as also can the force and the characteristic of the spring 22. This therefore provides a convenient way of adapting the respective hydraulic circuit to the requirement which are encountered in practice.

As will be seen from FIG. 4, after having produced the current pulse $I/I_N \approx 1$, the controller 3 reverts to its static control mode in which it is operative to produce a control action for eliminating interference parameters acting on the system. Let it be assumed at time 400 ms that a fresh control jump or change in signal is to occur, and more particularly, the desired value signal I is to be set to 0. The controller 3 then interrupts the supply of current to the solenoid 23 so that the return spring 22 returns the spool 21, whereby the restrictor means 36 is enlarged and the restrictor means 37 is reduced. That causes a rise in the pressure Px and the piston 13 is moved into its closing position.

The expression 'main valve' or 'displaceable piston' as used in the accompanying claims is to be interpreted in its broadest meaning, that is to say, it is to be construed as being a hydraulic means having a piston 13 which is to be adjusted. The piston 13 may therefore be the displacement setting piston of a variable displacement pump, a proportional directional control valve, or the like, and is not restricted to the throttle function. Accordingly, the manner in which the first force on the side 13a of the piston is produced is unimportant, whether it is produced by a delivery pressure in the delivery pressure chamber 6 or by a spring, in the case of the displacement setting piston of a variable displacement pump. Depending on the particular use involved, the second force on the side 13b of the piston is produced by purely hydraulic means or in combination with a spring 14.

Various modifications may be made in the above-described constructions without thereby departing from the scope of the invention as defined in the appended claims.

What is claimed is:

1. An electrically controllable valve assembly including:
   a displaceable piston as the member to be adjusted,
   a pilot valve for controlling the position of the piston, and
   an electronic controller for controlling the pilot valve, wherein
   a first force producing means is provided to act on one area of said displaceable piston,
   a second force producing means is provided to act on an opposing area of said displaceable piston, said second force being produced at least partly hydraulically by pressure in a control chamber;
   wherein said pilot valve comprises:
   a restrictor means array for a bleed flow from a main delivery line to a tank line,
   a spool for adjusting the restrictor means array, and
   an electrically actuable control member for adjusting the position of said spool of said pilot valve;
   wherein said restrictor means array includes:
   a first variable restrictor means disposed between a branch duct of a main delivery line and a control line connecting said control chamber and said pilot valve, and
   a second variable restrictor means disposed between said control line and a low-pressure chamber, the low pressure urging said spool in the direction of return movement thereof, and
   a third, permanently effective fixed restrictor means between said low-pressure chamber and said tank line.

2. A valve assembly as set forth in claim 1 including a further low-pressure chamber at the periphery of said spool between two piston means thereon, one piston means being by-passed by way of said third restrictor means.

3. A valve assembly as set forth in claim 2 wherein an axial bore in said spool is provided for a hydraulic communication between said two low-pressure chambers, and wherein a means in said axial bore forms said third restrictor means.

4. A valve assembly as set forth in claim 3 wherein said means in said axial bore forming said third restrictor means comprises a portion of said bore.

5. A valve assembly as set forth in claim 3 wherein said means in said axial bore forming said third restrictor means comprises an orifice means in said bore.

6. A valve assembly as set forth in claim 1 wherein said third restrictor means is formed as a laminar restrictor means.

7. A valve assembly as set forth in claim 1 wherein said electrical controller includes a travel detector operatively coupled to said displaceable piston.

8. An electrically controllable valve assembly comprising:

a housing having an intake port, a discharge port, a bore forming a communication between the intake post and the discharge port, a tank port, a branch line having a first end communicating with said bore, and a second end, and a control line having a first end communicating with said bore, and a second end; disposed in the housing, a piston constituting a member to be adjusted and displaceable in said bore to control communication between said intake port and said discharge port; means for applying a first force to one side of said displaceable piston; means for applying a second force to the other side of said displaceable piston, said second force being produced at least partly hydraulically by pressure in a control chamber defined by a portion of said bore in the housing;

a pilot valve operative to control the position of said displaceable piston and including: a valve housing having a space and a spool displaceable therein, restrictor means for controlling a bleed flow of hydraulic fluid from said intake port via said branch line to saaid tank port; said displaceable spool operable to control the restrictor means and communicating with said second ends of said branch line and said control line; and a low-pressure chamber defined by said valve housing and said spool of said pilot valve, a pressure in said chamber being operative to urge the pilot valve spool in the return direction thereof; the restrictor means comprising: a first variable restrictor between said branch line and said control line; and second variable restrictor between said control line and said low-pressure chamber; and a third fixed restrictor which is permanently operative, between said low-pressure chamber and said tank port, and an electrically operable control member for adjusting the position of said spool of said pilot valve.

9. A valve assembly as set forth in claim 1 wherein said third restrictor means is formed by a longitudinal bore in said spool of said pilot valve and by two transverse bores in said spool, one of them being connected to said low pressure chamber, the other being connected to said tank line.

10. A valve assembly as set forth in claim 1 wherein said pilot valve has a return spring acting on said spool, wherein said spool has a piston area arranged to seal said low pressure chamber against said main delivery line, and said third restrictor means to connect said low pressure chamber to said tank line, said return spring, said piston area of said spool and said third restrictor means being dimensioned in such a way that a generally constant control flow of predetermined rate is allowed to flow through said second variable restrictor means in a dynamic control mode of the valve assembly.

* * * * *